April 1, 1924.

P. H. HERBERT

SPECTACLE TEMPLE

Filed June 20, 1923

Inventor
Pitt H. Herbert
by David Rines
Attorney

Patented Apr. 1, 1924.

1,488,496

UNITED STATES PATENT OFFICE.

PITT H. HERBERT, OF SOUTHBRIDGE, MASSACHUSETTS, ASSIGNOR, BY MESNE ASSIGNMENTS, TO BAUSCH AND LOMB OPTICAL COMPANY, OF ROCHESTER, NEW YORK, A CORPORATION OF NEW YORK.

SPECTACLE TEMPLE.

Application filed June 20, 1923. Serial No. 646,598.

*To all whom it may concern:*

Be it known that I, PITT H. HERBERT, a citizen of the United States, and a resident of Southbridge, in the county of Worcester and Commonwealth of Massachusetts, have invented a new and useful Improvement in Spectacle Temples, of which the following is a specification.

The present invention, though having also other fields of application, is more particularly related to spectacle temples.

Spectacle temples are adapted to be hinged to the lens-carrying frame at their forward ends, and to engage the skull or behind the ear at their rear ends. The rear ends should therefore be flexible, else they would bind uncomfortably against some portion of the wearer's head. They should not, on the other hand, be too flexible, because they could not then perform their required function of holding the lens-carrying frame in place. The well known, metal, cable temple serves the purpose well. If the lens-carrying frame is constituted of zylonite or other non-metallic material, however, it is not practicable to employ a metal temple; and temples constituted of non-metallic material have generally been stiff and unyielding, often causing the wearer much discomfort.

It is therefore an object of the present invention to provide a spectacle temple having the appearance of zylonite or other non-metallic material, the rear portions of which shall be flexible. Other objects will appear hereinafter.

With these objects in view, a feature of the invention resides in reinforcing a non-metallic tube with a metal or other flexible wire, and coiling the tube with the reinforcing wire therein into the form of a helix. The resulting product has the appearance of the non-metallic material, but is flexible both longitudinally and transversely.

Figure 1:
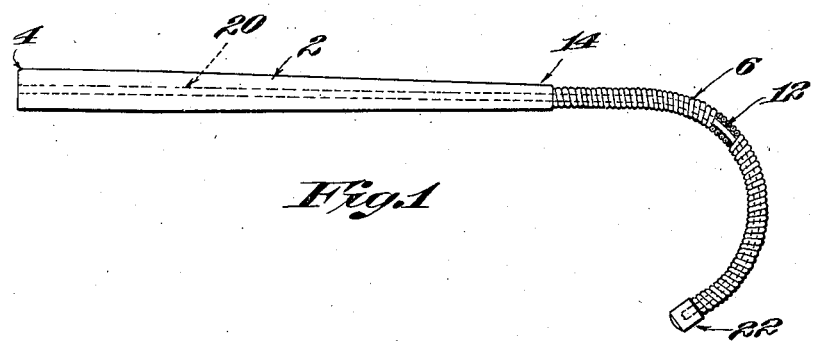
Figure 2:
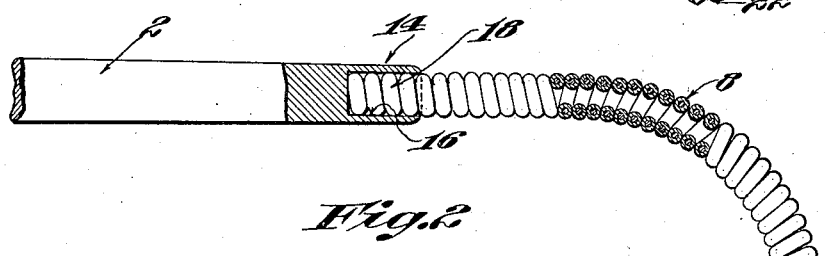
Figure 3:
Figure 4:
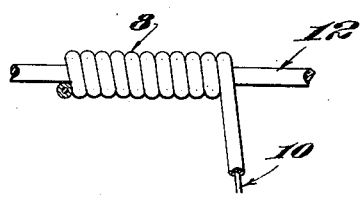

The invention will now be described more specifically in connection with the accompanying drawings, in which Fig. 1 is an elevation of a spectacle temple constructed according to a preferred embodiment of the present invention, part being shown in section; Fig. 2 is a similar enlarged fragmentary view of a modification; and Figs. 3 and 4 are views illustrating the manufacture of the temple of the present invention.

Spectacle temples usually comprise a forward portion 2 at the forward end 4 of which the temple is adapted to be hinged to a lens-carrying frame (not shown), and a rear portion 6 that is adapted to engage some part of the head of the wearer, as the skull, or behind the ear. The temple shown in the drawings is of the non-metallic type, with the rear portion flexible. The forward portion 2 may also be rendered flexible, if desired.

Flexibility is attained, according to the present invention, and without destroying the non-metallic appearance of the temple, by coiling a non-metallic tube 8 into the form of a helix, as shown. Such a tube will be flexible both longitudinally and transversely. As such a helix may prove to be too flexible for ordinary purposes, it is preferred to mount a reinforcing metal or other wire 10 in the tube before coiling it. Depending upon the nature of the wire 10, the temple may be given just the degree of flexibility desired. The helix is then bent into the desired shape, the ear-engaging type being illustrated in Figs. 1 and 2. Whether or not the reinforcing wire 10 is employed, a reinforcing rod 12 may be mounted in the helix before bending the helix to the desired shape. The reinforcing rod 12 may be particularly desirable if the forward portion 2 and the rear portion 6 both are constituted of a helix, as described; or the reinforcing rod 12 may be constituted of another helix, of more or less flexible material, as desired. In fact, if it is desired that the forward portion of the temple be constituted of metal, the rod 12 may itself serve as such metal.

It is preferred, however, to have the forward portion 2 constituted of a non-metallic member, such as is ordinarily employed in non-metallic spectacle temples, and as is illustrated in Figs. 1 and 2. The forward portion 2 and the rear portion 6 must then be connected together in some suitable and efficient manner. According to the preferred construction illustrated, the rear end 14 of the non-metallic member 2 is provided with an opening 16 within which the forward end 18 of the helix is secured. This may be done in any desired manner, as by crimping the non-metallic material of the member 2 near the end 14 over against the forward portion 18 of the helix with the aid of heat and pressure. In case a reinforcing rod 12 is employed, the non-metallic member 2 may be bored at 20 to form a tube, and the rod 12 may be extended through the bore 20 of the tube, to reinforce not only the helix, but the non-metallic member 2 as well. The rear end of the temple may be provided with a cap 22.

It will, of course, be understood that the modifications illustrated and described herein do not, by any means, exhaust the possibilities of this invention. Other modifications will readily occur to persons skilled in the art, and all such are considered to fall within the spirit of the invention, the scope of which is defined in the appended claims.

What is claimed is:

1. A spectacle temple comprising a tube and a reinforcing wire mounted within the tube, the tube with the wire therein being coiled into the form of a helix and the helix being bent to the shape of a temple.

2. A spectacle temple comprising a forward portion and a rear portion, the rear portion comprising a non-metallic tube and a reinforcing wire mounted within the tube, the tube with the wire therein being coiled into the form of a helix and the helix being bent to the shape of a temple, the temple being adapted to be hinged at the forward end.

3. A spectacle temple comprising a tube, a wire mounted within the tube, the tube with the wire therein being coiled into the form of a helix, and a reinforcing rod within the helix, the helix and the reinforcing rod therein being bent to the shape of a temple.

4. A spectacle temple comprising a forward portion and a rear portion, the rear portion comprising a non-metallic tube and a reinforcing wire mounted within the tube, the tube with the wire therein being coiled into the form of a helix, and a reinforcing rod within the helix, the helix and the reinforcing rod therein being bent to the shape of a temple, and the temple being adapted to be hinged at the forward end.

5. A spectacle temple comprising a forward portion and a rear portion, the forward portion comprising a non-metallic tube and the rear portion comprising a non-metallic tube and a reinforcing wire mounted within the tube, the tube with the wire therein being coiled into the form of a helix, and a reinforcing rod within the tube of the forward portion and within the helix, the helix and the reinforcing rod therein being bent to the shape of a temple, and the temple being adapted to be hinged at the forward end.

6. A spectacle temple comprising a forward portion and a rear portion, the forward portion comprising a non-metallic member the rear end of which is provided with an opening and the rear portion comprising a non-metallic tube and a reinforcing wire mounted within the tube, the tube with the wire therein being coiled into the form of a helix and the helix being bent to the shape of a temple, the forward end of the helix being secured within the opening, and the temple being adapted to be hinged at the forward end.

7. A spectacle temple comprising a non-metallic tube coiled into the form of a helix, the helix being bent to the shape of a temple, and the temple being adapted to be hinged at the forward end.

8. A spectacle temple comprising a non-metallic tube coiled into the form of a helix, and a reinforcing rod within the helix, the helix and the reinforcing rod therein being bent to the shape of a temple, and the temple being adapted to be hinged at the forward end.

9. An article of the class described comprising a non-metallic tube and a reinforcing wire mounted within the tube, the tube with the wire therein being coiled into the form of a helix.

10. An article of the class described comprising a non-metallic tube, a reinforcing wire mounted within the tube, the tube with the wire therein being coiled into the form of a helix, and a reinforcing rod within the helix, the helix and the reinforcing rod therein being bent transversely.

11. A spectacle temple comprising a tube coiled into the form of a helix, the helix being bent to the shape of a temple, and the temple being adapted to be hinged at the forward end.

12. A spectacle temple comprising a forward portion and a rear portion, the rear portion comprising a tube coiled into the form of a helix, the helix being bent to the shape of a temple, and the temple being adapted to be hinged at the forward end.

In testimony whereof, I have hereunto subscribed my name this 14th day of June, 1923.

PITT H. HERBERT.